(12) United States Patent  
Suzuki

(10) Patent No.: US 7,868,256 B2  
(45) Date of Patent: Jan. 11, 2011

(54) GROMMET

(75) Inventor: Takashi Suzuki, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 429 days.

(21) Appl. No.: 12/066,285

(22) PCT Filed: Mar. 7, 2007

(86) PCT No.: PCT/JP2007/054393

§ 371 (c)(1),  
(2), (4) Date: Mar. 10, 2008

(87) PCT Pub. No.: WO2008/044345

PCT Pub. Date: Apr. 17, 2008

(65) Prior Publication Data

US 2010/0147557 A1 Jun. 17, 2010

(30) Foreign Application Priority Data

Oct. 13, 2006 (JP) .............................. 2006-279943

(51) Int. Cl.  
*H01B 17/58* (2006.01)

(52) U.S. Cl. ............... 174/153 G; 174/151; 174/152 G; 16/2.1; 248/56

(58) Field of Classification Search ................ 174/151, 174/152 G, 153 G, 31 R; 16/2.1, 2.2; 248/56; 439/274, 275  
See application file for complete search history.

(56) References Cited

U.S. PATENT DOCUMENTS 6,603,078 B2 * 8/2003 Okuhara et al. ......... 174/153 G

| 6,933,439 | B2 * | 8/2005 | Nishihara et al. ........... 174/481 |
| 2003/0017027 | A1 | 1/2003 | Nakata |
| 2003/0056974 | A1 | 3/2003 | Nakata et al. |
| 2005/0253384 | A1 | 11/2005 | Taira |

FOREIGN PATENT DOCUMENTS

| JP | 2001-251736 | 9/2001 |
| JP | 2001-258129 | 9/2001 |
| JP | 2003-348736 | 12/2003 |

OTHER PUBLICATIONS

English language Abstract of JP 2001-251736.  
English language Abstract of JP 2003-348736.  
English language Abstract of JP 2001-258129.

* cited by examiner

*Primary Examiner*—Dhiru R Patel  
(74) *Attorney, Agent, or Firm*—Greenblum & Bernstein P.L.C.

(57) ABSTRACT

A grommet, made of an elastic body, is externally mounted on a group of electric wires to be spanned between a car-body panel and a movable body consisting of a door or a trunk lid coupled to the car-body panel through a hinge member. The grommet has large-diameter cylindrical parts which are disposed on one and other ends thereof in a longitudinal direction thereof and have an annular locking groove respectively to be inserted into and locked to a through-hole formed through the car-body panel and a through-hole formed through the trunk lid respectively; small-diameter cylindrical parts continuous with the large-diameter cylindrical parts respectively; and a bellows-like cylindrical part provided between the small-diameter cylindrical parts with the bellows-like cylindrical part continuous with the small-diameter cylindrical parts.

6 Claims, 5 Drawing Sheets

GROMMET

TECHNICAL FIELD

The present invention relates to a grommet and more particularly to a grommet externally mounted on a group of electric wires wired between a car-body panel and a door of a car body or a trunk lid thereof.

BACKGROUND ART

Conventionally, in a car, in wiring a wire harness by spanning the wire harness between a car-body panel 1 and a trunk lid 2 which is opened or closed, as shown in FIG. 4, a grommet 3 is externally mounted on the wire harness for waterproofness and dust resistance of the wire harness. The present applicant proposed such a grommet 3, as disclosed in Japanese Patent Application Laid-Open No. 2001-258129 (patent document 1). The grommet 3 is composed of the bellows-like cylindrical part 3a through which the wire harness is inserted and the locking cylindrical part 3b, continuous with the bellows-like cylindrical part 3a, which is formed at both ends of the bellows-like cylindrical part 3a. The locking cylindrical part 3b is inserted into and locked to the through-holes formed through the car-body panel 1 and the trunk lid 2.

As shown in FIG. 5, the bellows-like cylindrical part 3a of the grommet 3 through which electric wires have been inserted is bent in the shape of U, when the trunk lid 2 is closed. The number of the electric wires to be inserted through the grommet 3 is different according to the kind and grade of a car. When the number of the electric wires is large, the electric wires have a high rigidity.

Thus as shown in FIG. 5(A), the bellows-like cylindrical part 3a gently curves in the shape of U. On the other hand, when the number of the electric wires is small, the electric wires have a low rigidity. Thus as shown in FIG. 5(B), the bellows-like cylindrical part 3a that has been curved in the shape of U bends greatly at a curved portion. Therefore there is a case in which the bent portion has a small curvature R. When the trunk lid 2 is opened, the bellows-like cylindrical part 3a of the grommet 3 through which the wire harness has been inserted becomes straight. Owing to opening and closing the trunk lid 2, the bellows-like cylindrical part 3a repeats a bent state in which the bellows-like cylindrical part 3a has a small curvature R and a straight state. As a result, the electric wires inserted through the grommet 3 undergo metal fatigue and are damaged. In this case, there is a fear that the electric wires are broken. There is also a fear that the grommet 3 is damaged.

Patent document 1: Japanese Patent Application Laid-Open No. 2001-258129

DISCLOSURE OF THE INVENTION

Problem To Be Solved By The Invention

The present invention has been made in view of the above-described problems. Therefore it is an object of the present invention to allow a bent portion of a bellows-like cylindrical part of a grommet which is bent in the shape of U to have a high curvature R irrespective of the number of electric wires to be inserted through the grommet and decrease the degree of metal fatigue of the electric wires to be inserted through the grommet, even though the bellows-like cylindrical part repeats a bent state and a straight state owing to opening and closing of a movable body consisting of door or a trunk lid and thereby prevent the grommet from being damaged.

Means For Solving The Problem

To achieve the object, the present invention provides a grommet, made of an elastic body, which is externally mounted on a group of electric wires to be spanned between a car-body panel and a movable body consisting of a door or a trunk lid coupled to the car-body panel through a hinge member.

The grommet has large-diameter cylindrical parts which are disposed on one and other ends thereof in a longitudinal direction thereof and have an annular locking groove respectively to be inserted into and locked to a through-hole formed through the car-body panel and a through-hole formed through the trunk lid respectively; small-diameter cylindrical parts continuous with the large-diameter cylindrical parts respectively; and a bellows-like cylindrical part provided between the small-diameter cylindrical parts with the bellows-like cylindrical part continuous with the small-diameter cylindrical parts.

In the above-described construction, the bellows-like cylindrical part is bent in a shape of U, when the movable body is closed.

The bellows-like cylindrical part has large-diameter mountain portions and small-diameter valley portions formed over a whole length thereof at regular intervals with the mountain portions continuous and alternating with the valley portions.

In a state in which the bellows-like cylindrical part is bent in the shape of U, a thickness of a thick region including an apex of a bent portion therein is set larger than that of other region so that a curvature of the bent portion is large.

In the above-described construction, in the state in which the bellows-like cylindrical part of the grommet is bent in the shape of U, the thickness of the required region of the bellows-like cylindrical part including the apex of the bent portion therein is set larger than that of the other region so that the curvature R of the bent portion is large. Therefore the rigidity of the required region of the bellows-like cylindrical part including the apex of the bent portion therein is enhanced. Thus by bending the bellows-like cylindrical part at a generous radius, it is possible to prevent the bellows-like cylindrical part from being bent at an acute angle. Therefore even though the grommet repeats a linear state and a bent state owing to the opening and closing of the movable body consisting of the door or the trunk lid, it is possible to decrease the degree of the generation of metal fatigue in the electric wires inserted through the grommet and thus prevent the grommet from being damaged.

Further in the present invention, the bellows-like cylindrical part has the large-diameter mountain portions and the small-diameter valley portions formed over the whole length thereof at regular intervals, with the mountain portions continuous and alternating with the valley portions, and the thickness of the required region is different from that of the other region. Therefore the grommet can be easily designed.

Further the thickness of the required region is set large to enhance the rigidity of the grommet. Therefore even though the number of the electric wires is small and hence even though the rigidity of the grommet cannot be enhanced by the electric wires, it is possible to bend the grommet at a large curvature and preferably use the grommet.

It is preferable that the thickness of the thick region is set to 1.3 to 2 times larger than that of the other region.

The reason it is preferable to set the thickness of the thick region to 1.3 to 2 times larger than that of the other region is as follows: If the thickness of the thick region is set smaller than that of the other region by less than 1.3 times, it is impossible to make the curvature of the bent portion sufficiently large. Thereby the grommet is incapable of displaying a sufficient effect of preventing the electric wires inserted therethrough from being broken. On the other hand, if the thickness of the thick region is set larger than that of the other region by more than two times, the rigidity of the bent portion of the grommet is so high that the grommet is incapable of smoothly moving in conformity to the movement of the movable body consisting of the door or the trunk lid, and the space in the bent portion through which the electric wires are inserted is small. Thereby there is a fear that the number of the electric wires which can be inserted into the grommet is limited.

It is preferable that the thick region has a maximum thickness at an apex of the bent portion thereof and that a thickness of the thick region is set gradually smaller to both sides thereof.

The apex of the bent portion of the grommet bends to the highest extent. Thus as described above, by so constructing that the thick region has the maximum thickness, it is possible to make the curvature R of the bent portion large. The more distant from the apex of the bent portion, the lower the flexure of the bellows-like cylindrical part. Therefore it is unnecessary to set the thickness of a portion of the bellows-like cylindrical part distant from the apex of the bent portion as large as that of the apex of the bent portion. By making the thickness of the bellows-like cylindrical part gradually smaller to both sides thereof as described above, it is possible to minimize a weight increase of the grommet and keep the grommet appropriately flexible.

It is preferable that in a state in which the bellows-like cylindrical part is bent in the shape of U, a length of the thick region is set less than a length, including the apex of the bent portion, between a central position of one side part of the bellows-like cylindrical part and a central position of other side part thereof.

In the state in which the grommet is bent in the shape of U, the portion in the neighborhood of the central position of each side part disposed at both sides of the apex of the bent portion has the lowest flexure degree. Therefore it is unnecessary to increase the thickness of the portion in the neighborhood of the central position of each side part. As described above, in the state in which the bellows-like cylindrical part is bent in the shape of U, the length of the thick region is set less than the length, including the apex of the bent portion, between the central position of one side part of the bellows-like cylindrical part and the central position of other side part thereof. Thereby it is possible to keep the grommet appropriately flexible, restrain a weight increase of the grommet to a minimum necessary degree, and make the curvature R of the bent portion high to thereby obtain the effect of preventing the breakage of the electric wires inserted through the grommet.

It is preferable that in the bellows-like cylindrical part continuous with the small-diameter cylindrical part disposed at one side of the grommet locked to the car-body panel, when the bellows-like cylindrical part is bent in the shape of U, a thickness of a region disposed in a range from one end of the bellows-like cylindrical part to the central position of the one side part thereof is set equally to that of the thick region including the apex of the bent portion therein and that a thickness of the small-diameter cylindrical part is set larger than that of the bellows-like cylindrical part continuous with the small-diameter cylindrical part.

In addition to the above-described problem, the conventional grommet has another problem that when the grommet is bent in the shape of U by the closing of the door or the trunk lid, the bellows-like cylindrical part continuous with one side of the small-diameter cylindrical part locked to the car-body panel is liable to flex outward. Consequently the grommet which has flexed outward interferes with peripheral parts disposed in the limited space between the car-body panel and the door or the trunk lid. Thereby the grommet is damaged, and an abnormal sound is generated by vibration of a car.

In the above-described construction, in the bellows-like cylindrical part continuous with the small-diameter cylindrical part disposed at one side of the grommet locked to the car-body panel, when the bellows-like cylindrical part is bent in the shape of U, the thickness of the region disposed in the range from one end of the bellows-like cylindrical part to the central position of the one side part thereof is set equally to that of the thick region including the apex of the bent portion therein. Therefore it is possible to enhance the rigidity of the region, of the bellows-like cylindrical part, disposed in the range from one end of the bellows-like cylindrical part to the central position of the one side part thereof. Thereby when the grommet is bent in the shape of U, it is possible to prevent the bellows-like cylindrical part continuous with the small-diameter cylindrical part disposed at one side of the grommet locked to the car-body panel from greatly curving outward. Thus it is possible to prevent the grommet bent in the shape of U from interfering with peripheral parts disposed at the side of the car-body panel. Therefore it is possible to prevent the grommet from being damaged and an abnormal sound from being generated because the grommet does not interfere with the peripheral parts.

In the above-described construction, the thickness of the small-diameter cylindrical part is set larger than that of the bellows-like cylindrical part. Therefore it is possible to enhance the rigidity of the grommet at its one end, locked to the car-body panel, which is susceptible to a large force and securely protect the electric wires inserted through the grommet.

More specifically, the movable body consists of a trunk lid; the car-body panel to be coupled to the trunk lid through a hinge member is disposed outside the bellows-like cylindrical part which is bent in the shape of U; and the bellows-like cylindrical part is provided with a thick part to enhance a rigidity thereof and restrain the bellows-like cylindrical part from curving outward so that the bellows-like cylindrical part does not contact the car-body panel.

Because in the above-described construction, the grommet bent in the shape of U does not curve outward, it is possible to dispose the grommet in a small space disposed between the car-body panel and the trunk lid and prevent the grommet from interfering with the car-body panel and from being damaged.

Effect Of The Invention

In the above-described construction, in the state in which the bellows-like cylindrical part of the grommet is bent in the shape of U, the thickness of the required region of the bellows-like cylindrical part including the apex of the bent portion therein is set larger than that of the other region so that the curvature R of the bent portion is large. Therefore the rigidity of the required region of the bellows-like cylindrical part including the apex of the bent portion therein is enhanced. Thus it is possible to prevent the bellows-like cylindrical part from being bent at an acute angle. Therefore irrespective of the number of the electric wires to be inserted into the grommet and even though the grommet repeats a linear state and a bent state owing to the opening and closing of the movable body consisting of the door or the trunk lid, it is possible to decrease the degree of the generation of metal fatigue in the electric wires inserted through the grommet and thus prevent the grommet from being damaged.

As described above, in the bellows-like cylindrical part continuous with the small-diameter cylindrical part disposed at one side of the grommet locked to the car-body panel, when the bellows-like cylindrical part is bent in the shape of U, the thickness of the region disposed in the range from one end of the bellows-like cylindrical part to the central position of the one side part thereof is set equally to that of the thick region including the apex of the bent portion therein. Therefore it is possible to enhance the rigidity of the region, of the bellows-like cylindrical part, disposed in the range from one end of the bellows-like cylindrical part to the central position of the one side part thereof. Thereby when the grommet is bent in the shape of U, it is possible to prevent the bellows-like cylindrical part continuous with the small-diameter cylindrical part disposed at one side of the grommet locked to the car-body panel from greatly curving outward. Thus it is possible to prevent the grommet bent in the shape of U from interfering with peripheral parts disposed at the side of the car-body panel. Therefore it is possible to prevent the grommet from being damaged and an abnormal sound from being generated because the grommet does interfere with the peripheral parts.

EXPLANATION OF REFERENCE NUMERALS AND SYMBOLS

Figure 1A:
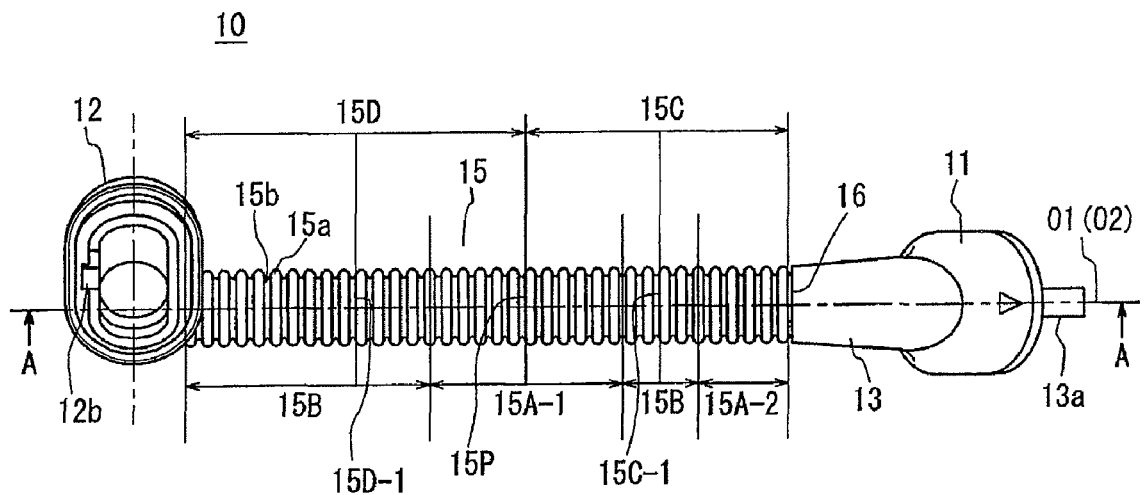
FIG. 1 shows a grommet of an embodiment of the present invention, in which (A) is a plan view, and (B) is a front view.

10: grommet
11, 12: large-diameter cylindrical part
11a, 12a: locking groove
13, 14: small-diameter cylindrical part
15: bellows-like cylindrical part
15a: mountain portion
15b: valley portion
15p: apex of bent portion
15A-1, 15A-2: thick region
15B: other region
15C, 15D: side part
15C-1, 15D-1: central position of both side parts
16: continuous portion
20: car-body panel
20b: through-hole
21: trunk lid (movable body)
21a: through-hole
22: hinge member

BEST MODE FOR CARRYING OUT THE INVENTION

The embodiment of the present invention will be described below with reference to the drawings.

Figure 1B:
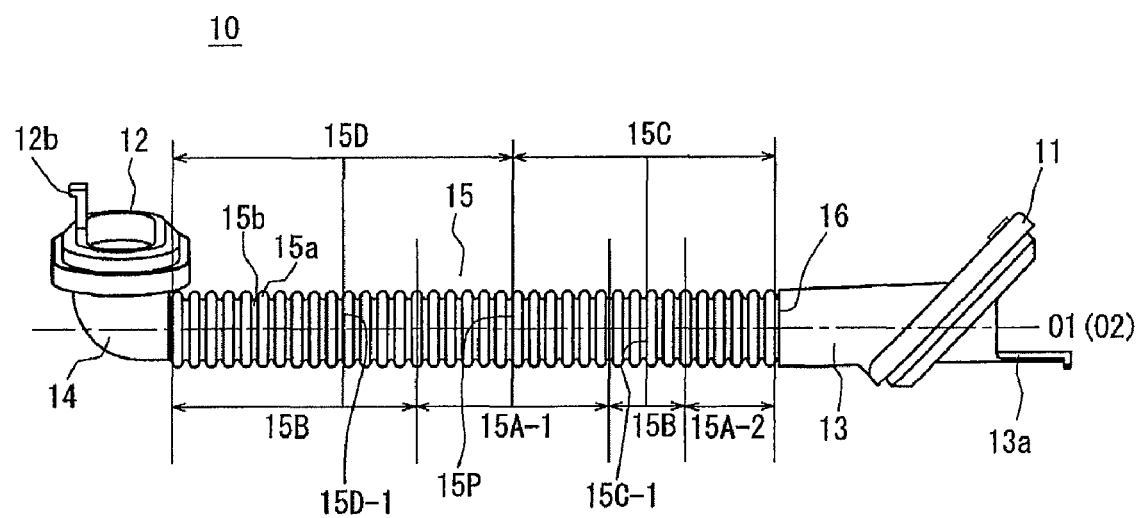
Figure 2:
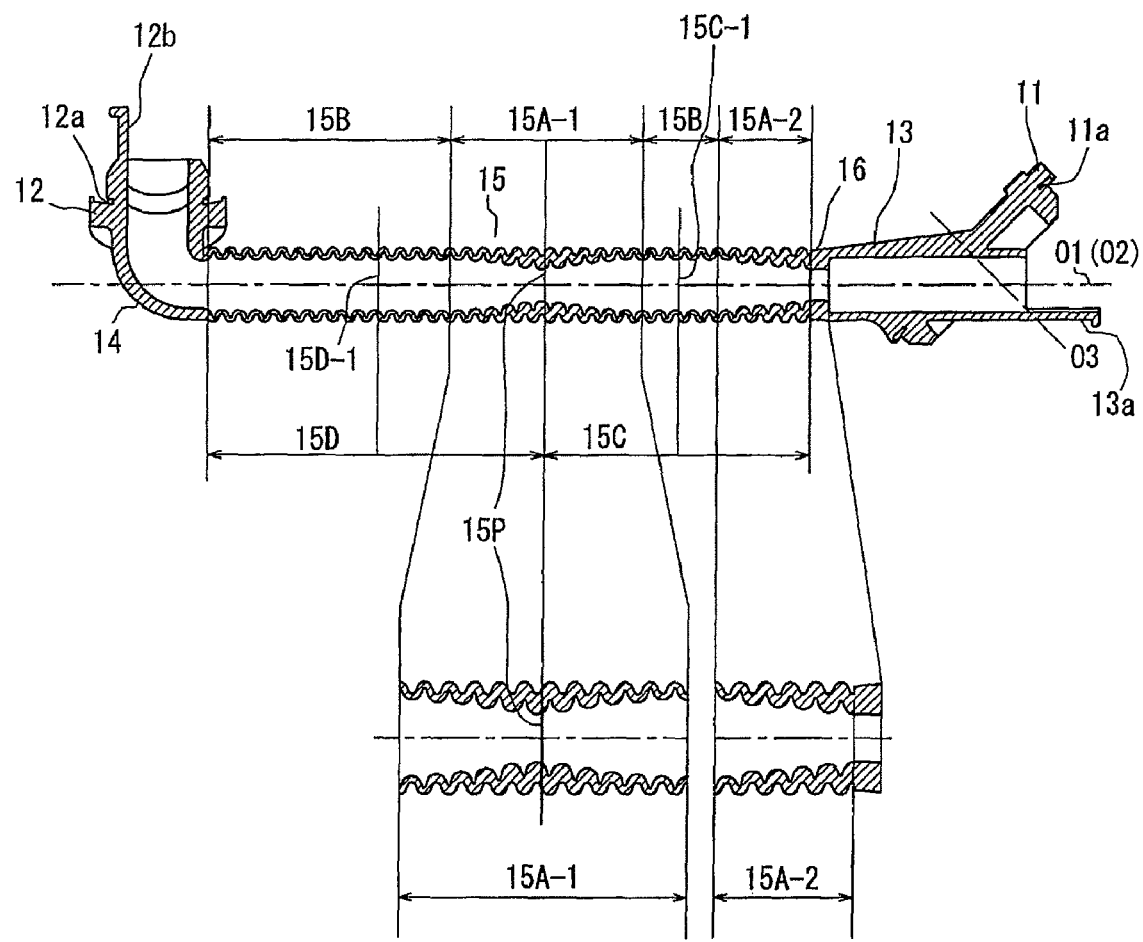
FIG. 2 is a sectional view taken along a line A-A of the grommet, and a sectional view showing enlarged main parts thereof.
Figure 3:
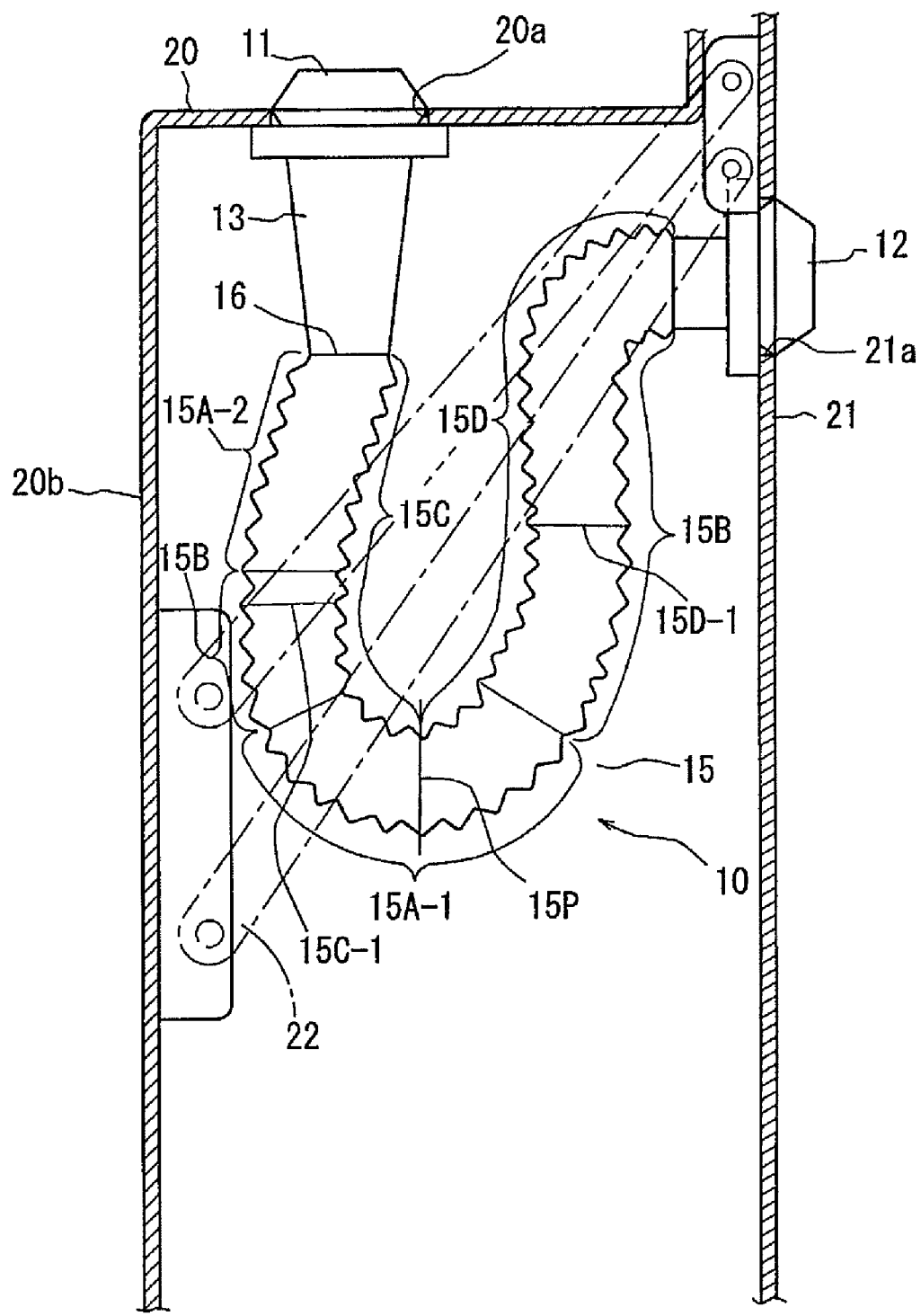
FIG. 3 shows a state in which the grommet is spanned between a car-body panel and a trunk lid.
Figure 4:
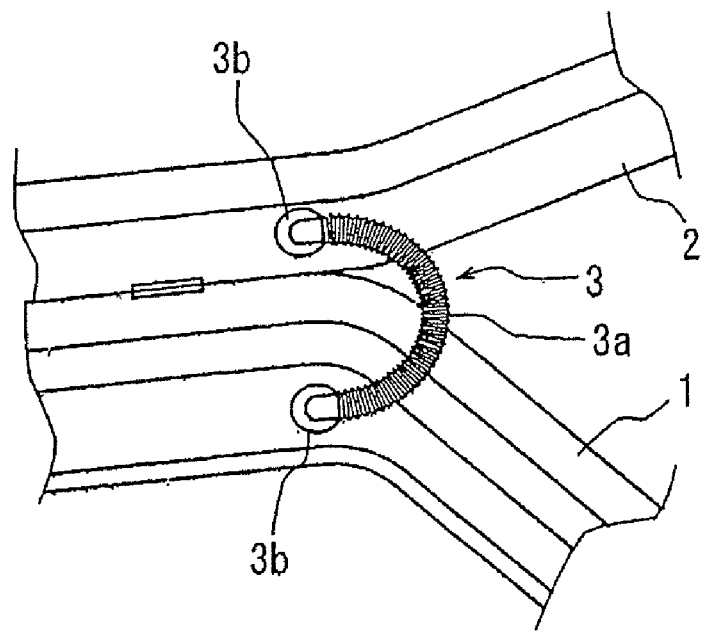
FIG. 4 shows a conventional art.
Figure 4:
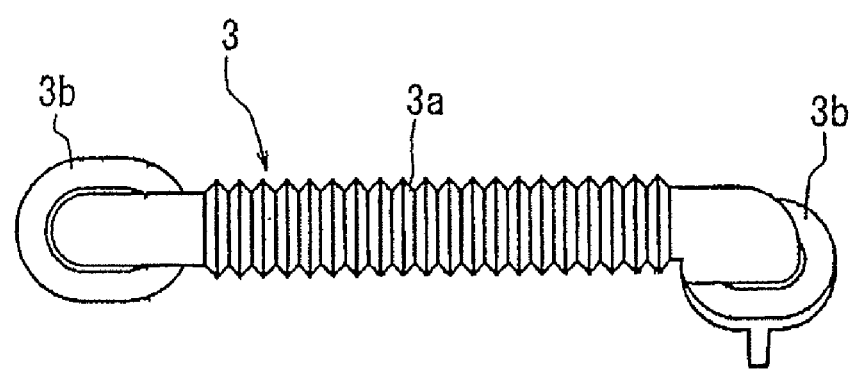
Figure 5:
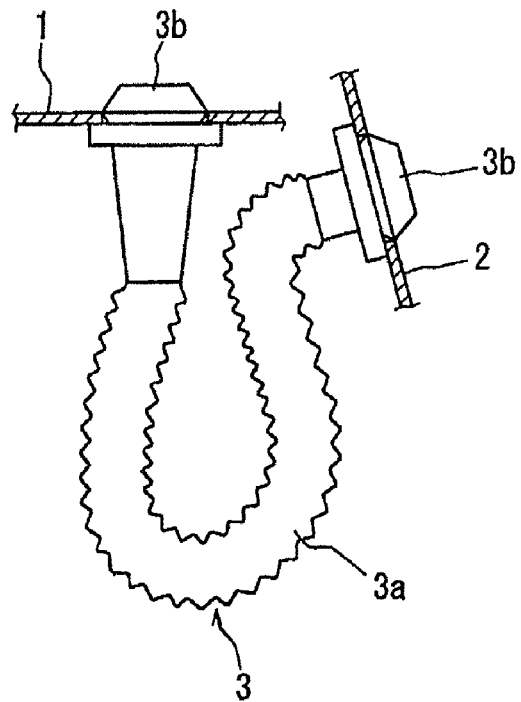
FIG. 5 shows the conventional art.
Figure 5:
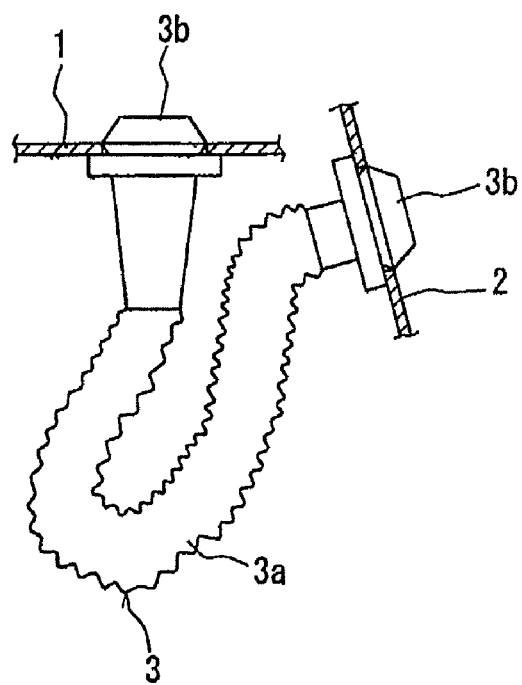

FIGS. 1 through 3 show an embodiment of the present invention. A grommet 10 is externally mounted on a group of electric wires (not shown) to be spanned between a car-body panel 20 and a trunk lid (movable body) 21 coupled to the car-body panel 20 through a hinge member.

Rubber such as EPDM (ethylene propylene rubber) or elastomer is integrally molded to form the grommet 10. The grommet 10 has short large-diameter cylindrical parts 11, 12 disposed on one and other ends thereof in a longitudinal direction thereof and having annular locking grooves 11a, 12a respectively to be inserted into and locked to a through-hole 20a formed through the car-body panel 20 and a through-hole 21a formed through the trunk lid 21 respectively; long small-diameter cylindrical parts 13, 14 continuous with the large-diameter cylindrical parts 11, 12 respectively; and a bellows-like cylindrical part 15 continuously provided between the small-diameter cylindrical parts 13 and 14.

The bellows-like cylindrical part 15 of the grommet 10 is bendable and has large-diameter mountain portions 15a and small-diameter valley portions 15b formed over the whole length thereof at regular intervals in the longitudinal direction thereof with the mountain portions 15a continuous and alternating with the valley portions 15b. As shown in FIG. 3, the bellows-like cylindrical part 15 is bent in the shape of U, when the trunk lid 21 is closed. In this embodiment, the whole length of the bellows-like cylindrical part 15 is set to 18 cm when the bellows-like cylindrical part 15 is unstretched. The outer diameter of the mountain portion 15a is set to 20 mm. The interval between the adjacent mountain portions 15a is set to 5 mm.

As shown in FIG. 3, in a state in which the bellows-like cylindrical part 15 is bent in the shape of U, a required region 15A-1 including an apex 15p of a bent portion therein is set as a region thicker than other region 15B so that the bent portion has a large curvature R. In this embodiment, when the bellows-like cylindrical part 15 is in an unstretched state, as shown in FIG. 1, the apex 15p of the bent portion is spaced at an interval of 7 cm from a continuous portion 16 where the small-diameter cylindrical part 13 disposed at one side of the grommet 10 locked to the car-body panel 20 is continuous with the bellows-like cylindrical part 15. A region which includes the apex 15p therein and is disposed between a position spaced at 5 cm from the continuous portion 16 and a position spaced at 9 cm from the continuous portion 16 is set as the thick region 15A-1. In the state in which the bellows-like cylindrical part 15 is bent in the shape of U, the length of the region 15A-1 is less than the length, including the apex 15p of the bent portion, between a central position 15C-1 of a side part 15C and a central position 15D-1 of a side part 15D.

The thickness of the bent portion at the apex 15p thereof is set to 2 mm which is the maximum thickness of the thick region 15A-1. The thickness of the thick region 15A-1 is set gradually smaller to 1 mm to both sides thereof.

A region from the continuous portion 16 where the small-diameter cylindrical part 13 disposed at the one side of the grommet 10 locked to the car-body panel 20 to a position spaced at an interval of 3 cm from the continuous portion 16 is set as a thick region 15A-2 thicker than the other region 15B. In the state in which the bellows-like cylindrical part 15 is bent in the shape of U, the region 15A-2 ranges from the continuous portion 16 to the central position 15C-1 of the side part 15C. The thickness of a portion, of the thick region 15A-2, which is continuous with the small-diameter cylindrical part 13 disposed at the one side of the grommet 10 locked to the car-body panel 20 is set to 2 mm which is the maximum thickness of the thick region 15A-2. The thickness of the thick region 15A-2 is set gradually smaller to 1 mm toward the central position 15C-1.

In the bellows-like cylindrical part 15, a region other than the thick regions 15A-1, 15A-2 is set as the other region 15B having a thickness of 1 mm (constant).

The small-diameter cylindrical part 13 thicker than the bellows-like cylindrical part 15 is disposed continuously with the bellows-like cylindrical part 15 at the one side of the grommet 10 locked to the car-body panel 20. An axis O2 of the small-diameter cylindrical part 13 is coincident with an axis O1 of the bellows-like cylindrical part 15. The small-diameter cylindrical part 13 has a long length of 65 mm. A tongue-like tape-winding piece 13a to which a group of electric wires is fixed by winding them around the tongue-like tape-winding piece 13a with a tape is projected from a tip of the small-diameter cylindrical part 13. There is provided the short and elliptic large-diameter cylindrical part 11 surrounding a tip-side peripheral surface of the small-diameter cylindrical part 13. The annular locking groove 11a is formed on the peripheral surface of the large-diameter cylindrical part 11. An axis O3 of the large-diameter cylindrical part 11 is inclined to the axis O2 of the small-diameter cylindrical part 13.

The small-diameter cylindrical part 14 is provided continuously with the bellows-like cylindrical part 15 at the other side of the grommet 10 locked to the trunk lid 21. The small-diameter cylindrical part 14 bends at about 90 degrees to the axis O1 of the bellows-like cylindrical part 15. The elliptic large-diameter cylindrical part 12 is provided continuously with the tip at a bent side of the small-diameter cylindrical part 14. The annular locking groove 12a is formed on the peripheral surface of the large-diameter cylindrical part 12. A tongue-like tape-winding piece 12a to which the group of the electric wires is fixed by winding them around the tongue-like tape-winding piece 13a with a tape is projected from the tip of the large-diameter cylindrical part 12.

The electric wires to be spanned between the car-body panel 20 and the trunk lid 21 are inserted into the grommet 10 and fixed to the tongue-like tape-winding pieces 13a, 12a disposed at both ends of the grommet 10 by winding the electric wires round the tongue-like tape-winding pieces 13a, 12a with the tapes. The locking groove 11a of the large-diameter part 11 disposed at one end of the grommet 10 and the locking groove 12a of the large-diameter part 12 disposed at the other end thereof are fitted on the periphery of the through-holes 20a, 21a respectively formed through the car-body panel 20 and the trunk lid 21 respectively. Thereby the grommet 10 is mounted on the car-body panel 20 and the trunk lid 21 by spanning the grommet 10 therebetween.

In a state in which the trunk lid 21 is opened with respect to the car-body panel 20, the bellows-like cylindrical part 15 of the grommet 10 is stretched almost linearly. On the other hand, in a state in which the trunk lid 21 is closed with respect to the car-body panel 20, as shown in FIG. 3, the bellows-like cylindrical part 15 bends in the shape of U. Outside the one side of the bent bellows-like cylindrical part 15 of the grommet 10 locked to the car-body panel 20, a bent portion 20b of the car-body panel 20 to be coupled to the trunk lid 21 through the hinge member 22 is disposed.

In the above-described construction, in the state in which the bellows-like cylindrical part 15 of the grommet 10 is bent in the shape of U, the thickness of the required region 15A-1 of the bellows-like cylindrical part 15 including the apex 15p of the bent portion therein is set larger than that of the other region 15B so that the curvature R of the bent portion is large. Therefore the rigidity of the required region 15A-1 of the bellows-like cylindrical part 15 including the apex 15p of the bent portion therein is enhanced. Thus it is possible to prevent the bellows-like cylindrical part 15 from being bent at an acute angle. Therefore irrespective of the number of the electric wires to be inserted into the grommet 10 and even though the grommet 10 repeats a linear state and a bent state owing to the opening and closing of the trunk lid 21, it is possible to decrease the degree of the generation of metal fatigue in the electric wires inserted through the grommet 10.

As described above, in the bellows-like cylindrical part 15 continuous with the small-diameter cylindrical part 13 disposed at the one side of the grommet 10 locked to the car-body panel 20, when the bellows-like cylindrical part 15 is bent in the shape of U, the thickness of the region 15A-2 disposed in the range from the continuous portion 16 to the central position 15C-1 of the side part 15C is set equally to that of the region 15A-1 including the apex 15p of the bent portion therein. Thus it is possible to enhance the rigidity of the region 15A-2 of the bellows-like cylindrical part 15 and prevent the part of the bellows-like cylindrical part 15 disposed at the one side of the grommet 10 locked to the car-body panel 20 from greatly curving outward, when the grommet is bent in the shape of U. Thereby it is possible to prevent the grommet 10 bent in the shape of U from interfering with the bent portion 20b of the car-body panel 20 and thereby prevent the grommet 10 from being damaged and an abnormal sound from being generated because the grommet 10 does not interfere with the hinge member 22.

Further because the thickness of each of the required regions 15A-1, 15A-2 is set large to enhance the rigidity of the grommet 10, not only a wire harness having a large number of electric wires and a high rigidity, but also a wire harness having a small number of electric wires and a low rigidity can be inserted through the grommet 10. Therefore it is possible to enhance the versatility of the grommet 10.

Although the grommet 10 is spanned between the car-body panel 20 and the trunk lid 21 in the embodiment, the grommet may be spanned between the car-body panel and a door such as a side door or a back door.

The invention claimed is:

1. A grommet, made of an elastic body, which is externally mounted on a group of electric wires to be spanned between a car-body panel and a movable body consisting of a door or a trunk lid coupled to said car-body panel through a hinge member, said grommet comprising large-diameter cylindrical parts which are disposed on one and other ends thereof in a longitudinal direction thereof and have an annular locking groove respectively to be inserted into and locked to a through-hole formed through said car-body panel and a through-hole formed through said trunk lid respectively; small-diameter cylindrical parts continuous with said large-diameter cylindrical parts respectively; and a bellows-like cylindrical part provided between said small-diameter cylindrical parts with said bellows-like cylindrical part continuous with said small-diameter cylindrical parts, wherein said bellows-like cylindrical part is bent in a shape of U, when said movable body is closed; and said bellows-like cylindrical part has large-diameter mountain portions and small-diameter valley portions formed over a whole length thereof at regular intervals with said mountain portions continuous and alternating with said valley portions; and in a state in which said bellows-like cylindrical part is bent in said shape of U, a thickness of a thick region including an apex of a bent portion therein is set larger than that of other region so that a curvature of said bent portion is large.

2. A grommet according to claim 1, wherein a thickness of said thick region is set to 1.3 to 2 times larger than that of said other region.

3. A grommet according to claim 1, wherein said thick region has a maximum thickness at the apex of said bent portion thereof; and a thickness of said thick region is set gradually smaller to both sides thereof.

4. A grommet according to claim 1, wherein in a state in which said bellows-like cylindrical part is bent in said shape of U, a length of said thick region is set less than a length, including said apex of said bent portion, between a central position of one side part of said bellows-like cylindrical part and a central position of other side part thereof.

5. A grommet according to claim 1, wherein in said bellows-like cylindrical part continuous with said small-diameter cylindrical part disposed at one side of said grommet locked to said car-body panel, when said bellows-like cylindrical part is bent in said shape of U, a thickness of a region disposed in a range from one end of said bellows-like cylindrical part to said central position of said one side part thereof is set equally to that of said thick region including said apex of said bent portion therein; and a thickness of said small-diameter cylindrical part is set larger than that of said bellows-like cylindrical part continuous with said small-diameter cylindrical part.

6. A grommet according to claim 5, wherein said movable body consists of a trunk lid; said car-body panel to be coupled to said trunk lid through a hinge member is disposed outside said bellows-like cylindrical part which is bent in said shape of U; and said bellows-like cylindrical part is provided with a thick part to enhance a rigidity thereof and restrain said bellows-like cylindrical part from curving outward so that said bellows-like cylindrical part does not contact said car-body panel.

\* \* \* \* \*